Feb. 2, 1960 P. BONNAFOUX Re. 24,775

PELLET MILL

Original Filed July 13, 1955 2 Sheets-Sheet 1

PAUL BONNAFOUX,
INVENTOR.

BY Thomas P. Maloney
ATTORNEY.

Feb. 2, 1960 P. BONNAFOUX Re. 24,775

PELLET MILL

Original Filed July 13, 1955 2 Sheets-Sheet 2

PAUL BONNAFOUX,
INVENTOR.

BY Thomas P. Maloney
ATTORNEY.

United States Patent Office

Re. 24,775
Reissued Feb. 2, 1960

24,775

PELLET MILL

Paul Bonnafoux, Lancaster, Calif., assignor of twenty percent to Thomas P. Mahoney, Los Angeles, twenty percent to Marie B. Bonnafoux, Lancaster, Calif., and twenty-six percent to Yvonne Bonnafoux Original No. 2,848,738, dated August 26, 1958, Serial No. 521,781, July 13, 1955. Application for reissue August 20, 1959, Serial No. 843,903

5 Claims. (Cl. 107—14)

Matter enclosed in heavy brackets [ ] appears in the original patent but forms no part of this reissue specification; matter printed in italics indicates the additions made by reissue.

This invention relates to a pellet mill and, more particularly, to a pellet mill of the rotary type wherein comminuted feeds and the like are fed into the mill and extruded thereby in the shape of hard, glossy pellets of cylindrical cross section.

Conventional rotary pellet mills usually include a housing having an inlet for the comminuted and moistened feed or other material, and an outlet from which the pellets may be discharged. Located in the housing is a rotatable pellet forming die which is provided with a plurality of pellet forming orifices and in the interior of which there is positioned a roller having a serrated surface which is adapted to extrude the feed or other material through the orifices in the die in an outward direction.

One of the major disadvantages of conventional, rotary pellet mills lies in the fact that relatively large power consumption is necessary to produce a relatively small quantity of pellets.

It is, therefore, an object of my invention to provide a rotary pellet mill wherein a plurality of rotatable dies is mounted within and supports a roller so that the rotatable dies are in driven relationship with a surface provided on the interior of the roller and so that feed or other material can be fed into the interior of the housing in which the roller is located and forced inwardly through orifices provided in the dies with a slightly greater consumption of horsepower than that necessary for the energization of the single die in conventional rotary pellet mill constructions.

One of the major disadvantages of rotary pellet mills of conventional construction lies in the fact that the dies are necessarily of relatively small diameter and, therefore, the rollers located within the dies to extrude feed or other material therethrough are of correspondingly small diameter. The small diameters of the dies and rollers result in a relatively small "nip" between the periphery of the roller and the interior surface of the dies so that considerable difficulty is encountered in feeding the comminuted feed or other material between the roller and die surfaces and jamming of the roller within the die is a common occurrence.

Another problem encountered in the use of conventional rotary pellet mills is the fact that, since the rollers are located eccentrically with respect to the surface of the dies, and since the pressures generated between the roller and die surfaces are extreme and of the order of 40,000 p.s.i., bearing breakdown is a common occurrence necessitating the tearing down of the conventional mills and the replacement of component parts of the bearings in which the dies and rollers are supported.

An additional object of my invention is the provision of a rotary pellet mill wherein the die members located within the roller are symmetrically arranged about the axis of rotation of the roller and thereby serve to support the roller at spaced points about its interior surface. In this manner, the pellet forming pressures are equalized about the circumference of the roller and the eccentric bearing loads encountered in conventional rotary pellet mills are eliminated.

Furthermore, because of the equalization of bearing loads due to the symmetrical distribution of the dies about the interior of the circumference of the roller, the frictional losses encountered in conventional rotary pellet mills are eliminated and thus proportionally smaller horsepower motor can be utilized to drive the roller and dies with greater resultant production than is possible in the case of conventional rotary pellet mills.

Moreover, because the roller is supported on the plurality of rotatable dies, the bearing and surface wear which does occur is equally distributed among the bearings for all of the dies and the necessity for frequent servicing of a rotary pellet mill constructed in accordance with the teachings of my invention is eliminated.

Other objects and advantages of my invention will be apparent from the following specification and the accompanying drawings which are for the purpose of illustration only and in which.

Figure 1:
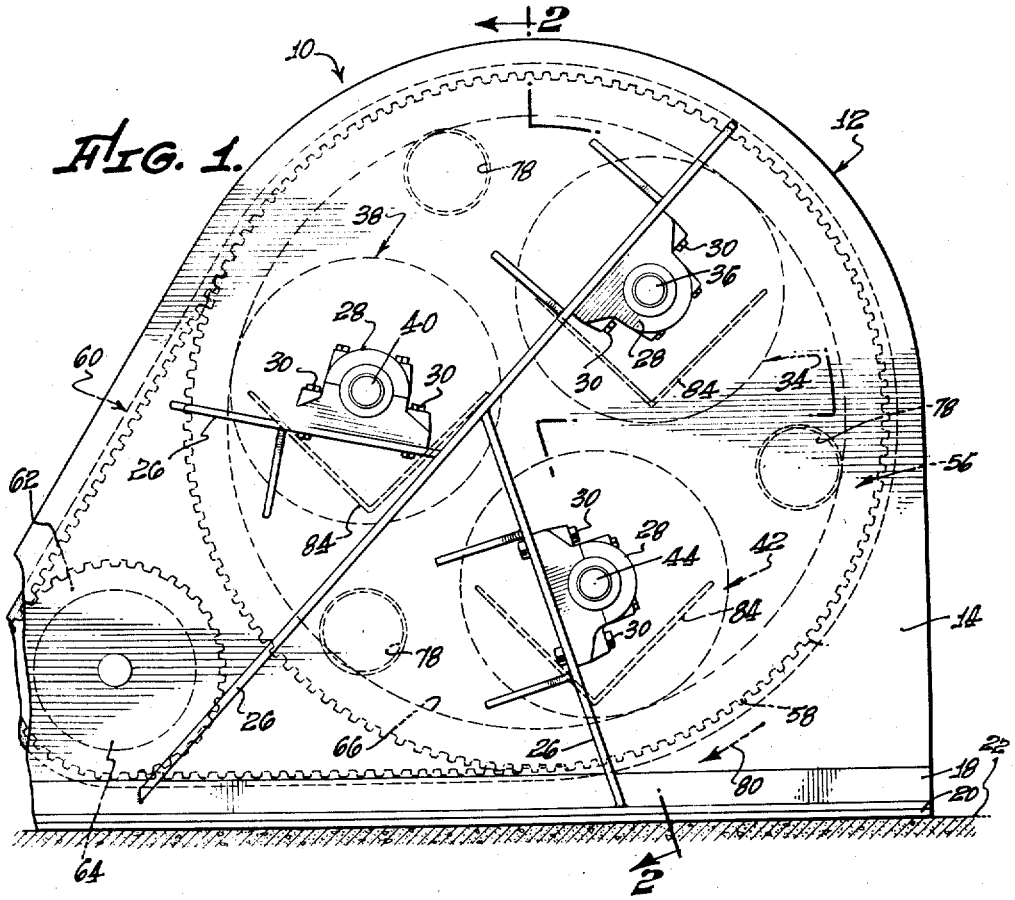
Fig. 1 is a vertical, side-elevational view of the housing of a rotary pellet mill constructed in accordance with the teachings of my invention.
Figure 3:
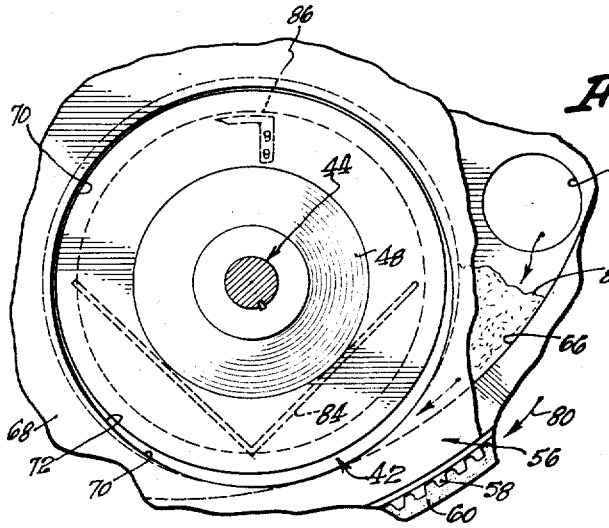
Fig. 3 is an enlarged, fragmentary view showing the relationship of a die with the interior circumferential surface on the roller.
Figure 2:
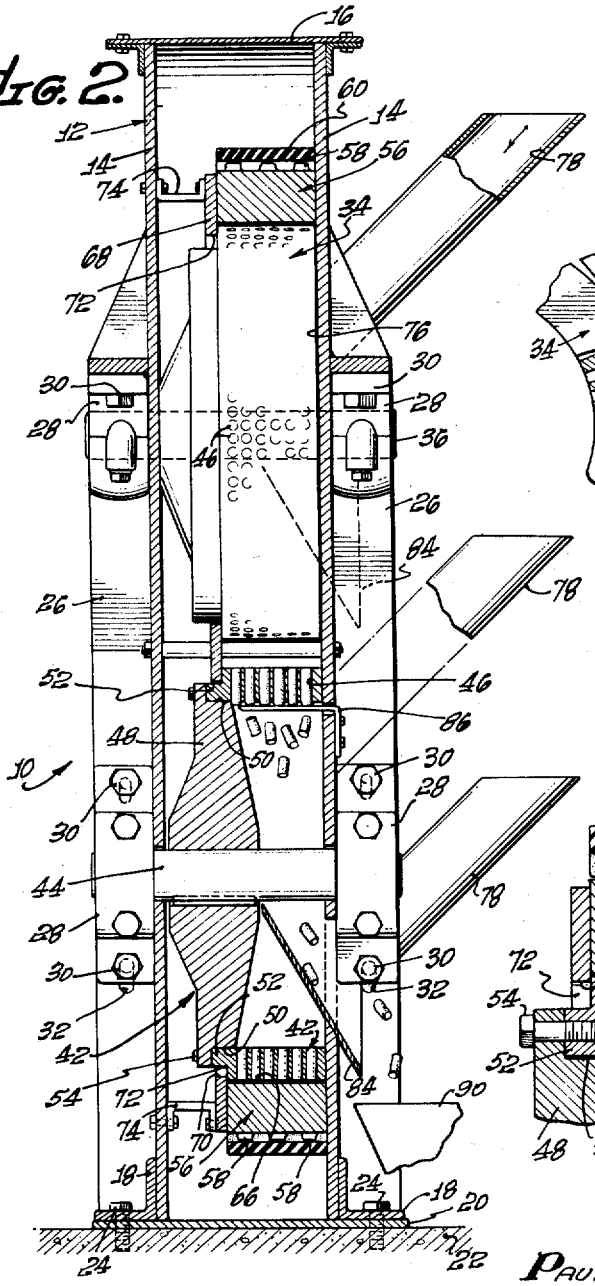
Fig. 2 is a vertical, sectional view taken on the broken line 2—2 of Fig. 1.

Referring to the drawings and particularly to Figs. 1–2 thereof, I show a rotary pellet mill 10 constructed in accordance with my invention and incorporated in a housing 12. The housing 12, as best shown in Figs. 1 and 3 of the drawings, is constituted by side plates 14 secured in operative relationship with each other by means of a cover 16 at their upper ends and at their lower ends bearing elongated angles 18 by means of which they are secured to a bed plate 20 and a bed 22 through the use of bolts 24.

Fastened to the exterior surfaces of the plates 14, as by means of welding, are supporting bars 26 which serve as mounts for pillow blocks 28 secured thereto in spaced pairs by means of bolts 30. Adjustments slots 32 are formed in the supporting bars 26, as best shown in Fig. 2 of the drawings, to permit the pillow blocks to be adjusted thereupon by the loosening of the bolts 30, for a purpose which will be described in greater detail below. Since all the bearings are located externally of the housing, they cannot be contaminated by the feed or subjected to intense heat within the roller as in conventional pellet mills.

Figure 4:
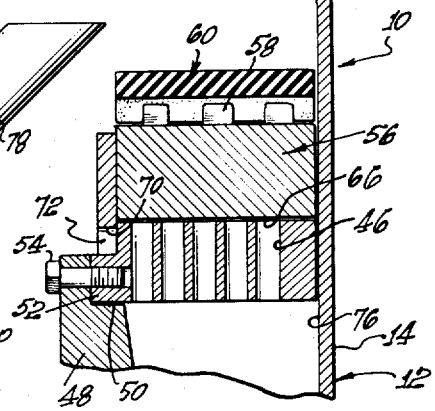
Fig. 4 is an enlarged, fragmentary view in vertical section showing the relationship between the pellet forming orifices in the die and the adjacent surface of the roller.

A first, uppermost rotary die 34, is, as best shown in Figs. 1 and 2 of the drawings, mounted for rotation within the housing 12 upon an axle 36 whose opposite ends are journaled in a spaced pair of pillow blocks 28, while a second, intermediate rotary die 38 is mounted within the housing 12 in spaced relationship with the first rotary die 34 upon an axle 40 whose opposite ends are mounted in another spaced pair of pillow blocks 28. In a similar manner, a third, lowermost rotary die 42 is mounted for rotation upon an axle 44 in spaced relationship with the first and second dies 34 and 38, respectively. Each of the rotary dies is, as best shown in Figs. 2 and 4 of the drawings, provided with a plurality of pellet forming orifices 46 which extend through the peripheral rim thereof in radial directions and the mounting of each of the dies is accomplished by the provision of a spider or hub 48 having a peripheral shoulder 50 thereupon for the reception of an axially extending flange 52 which is adapted to receive bolts 54 for securing said hub in operative relationship with said flange.

Mounted for rotation within the housing 12 of the pellet mill 10 upon the peripheries of the rotary dies 34, 38, and 42 is a roller 56, said roller, in the present embodiment of the invention, being provided on its periphery with a plurality of teeth 58 engageable by a drive belt 60 operatively connected to a driving sprocket 62 on an electric motor 64, as best shown in Fig. 1 of the drawings. The interior circumferential surface 66 of the roller 56 is engaged upon the peripheries of the rotary dies 34, 38, and 42 to drive said dies and is simultaneously supported for rotation thereupon. It would be possible to provide intermeshing gears on the roller and dies to create a positive drive between the same.

One edge of each of the dies 34, 38, and 42 is, as best shown in Fig. 2 of the drawings, juxtaposed to the inner surface of one of the side plates 14 of the housing 12 and there is mounted within the interior of the housing a baffle plate 68 having a plurality of openings 70 formed therein for the reception of the hubs 48 of said rotary dies. Each of the openings 70 is, as best shown in Figs. 2 and 3 of the drawings, drawn on a center spaced from the axis of rotation of the hub 48 with which it is associated to provide an adjustment gap 72 to permit the adjustment of the peripheries of the rotary dies toward the adjacent inner surface 66 of the roller 56 to accommodate for wear occasioned in the surface of the roller 56 and to insure that each of the rotary dies is adequately engaged upon said surface to assume its share of the burden of supporting said roller in the housing 12.

Moreover, it is essential that each of the rotary dies have its surface in operative engagement with the surface 66 of the roller 56 so that an optimum driving relationship be established between the roller 56 and the individual rotary dies located therein.

The baffle plate 68 is supported, as best shown in Fig. 2 of the drawings, upon the interior surface of the left-hand side wall 14 by means of brackets or spacers 74 and the baffle plate 68, in conjunction with the roller 56 and the interior surface of the opposite wall 14, thus constitutes a chamber 76 in which the rotary dies 34, 38, and 42 are located.

Communicating with the chamber 76 are spaced inlet chutes 78. The ends of the inlet chutes 78 are, as best shown in Fig. 1 of the drawings, so located that when the roller 56 is rotated in the clockwise direction indicated by the arrow 80, comminuted feed or other material will be fed thereby into the "nips" between the peripheral surfaces of the rotary dies 34, 38, and 42 and the circumferential inner surface 66 on the roller 56.

A plurality of discharge chutes 84 is mounted in the side wall 14 of the housing 12 that supports the inlet chutes 78 and the ends thereof are located within the interior of the rotary dies 34, 38, and 42 to receive pellets which are cut from material extruded through the pellet forming orifices 46 in the dies by means of knives 86 whose blades are juxtaposed to the interior circumferences of each of the dies at points substantially opposite the "nips" between the exterior circumferences of the dies and the roller 56.

Therefore, when the roller 56 is rotated by the energization of the motor 64 through the medium of the belt 60, concomitant rotation of the rotary dies 34, 38, and 42 will take place. If comminuted and moistened feed such as alfalfa is fed into the inlet chutes 78, a mass 88 thereof will be carried, as best shown in Fig. 3 of the drawings, into the "nip" between the periphery of each of the dies and the interior surface 66 on the roller 56. Because of the relatively large diameter of the roller 56 in relationship to the diameter of the rotary dies, there is a relatively large space at the "nip" of the dies with the interior surface 56 for the reception of the mass 88 of feed or other material.

Therefore, the rejection and jamming of the mass of feed 88 which occurs at the "nip" between the die and roller in conventional rotary pellet mills is eliminated because there is a sufficient space to receive a relatively large mass of feed. As best shown in Fig. 2 of the drawings, the feed is extruded through the pellet forming orifices 46 and as the dies are rotated in a clockwise direction simultaneously with the similar rotation of the roller 56, the extruded material ultimately is engaged by the blades of the knives 86 and the pellets are cut therefrom and fall into the discharge chutes 84 and are ultimately deposited in a pellet receiving hopper 90.

If wear is occasioned on the inner surface 66 of the roller 56, the rotary dies can be adjusted toward the surface 66 by loosening the bolts 30 in the pillow blocks 28 to permit the gap occasioned in the surface 66 to be accommodated. Moreover, as clearly shown by Fig. 1 of the drawings, the roller 56 is supported at spaced points by the symmetrically located rotary dies 34, 38, and 42 and thus both the surface wear and the bearing loads are distributed through the three rotary die members and are equalized thereby. In this manner, undue wear in the bearings and surfaces occasioned by eccentric positioning of the rollers in conventional rotary pellet mills is eliminated.

Figure 5:
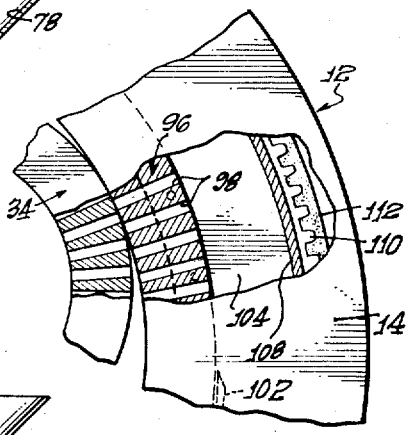
Fig. 5 is an enlarged, fragmentary view showing the relationship between the orifices in a die and roller in an alternative embodiment of the invention.

Shown in Fig. 5 of the drawings is an alternative embodiment of the invention wherein there is provided a roller 96 which incorporates a plurality of pellet forming orifices 98 which are staggered with respect to the pellet forming orifices provided in the rotary die members, such as the die member 34 shown in juxtaposition to the roller 96. In such a construction, there is a dual pellet forming action since pellets are extruded inwardly through the individual rotary dies, such as the die 34, and extruded outwardly and radially through the orifices 98 provided in the roller 96.

Since the three dies 34, 38, and 42 are utilized in conjunction with the pellet forming roller 96, it is necessary to provide three cutting blades, such as the blade 102, adjacent the periphery of the roller 96 so that the pellets extruded through the orifices 98 in the roller can be cut from the periphery of the roller. In order that a sufficient space may be provided for the discharge of the pellets, an auxiliary flange 104 is secured to the edge of the roller 96 and is provided with a peripheral circular baffle plate 108 which prevents the pellets from falling freely outward into the interior of the housing 12. Gear teeth 110 are secured to the auxiliary flange 104 and are driven by a belt 112 to cause rotation of the roller 96.

A discharge chute, not shown, communicates with the space defined by the auxiliary flange 104 and circular baffle plate 108 at the lower portion of the housing to permit all the pellets formed by the interaction of the dies 34, 38, and 42 to be discharged simultaneously from the space defined by the auxiliary flange 104 and the baffle plate 108. Thus, the production of pellets by the mill is considerably augmented because of the pellet forming action of the roller itself and the dies 34, 38, and 42 serve, in a sense, as rollers while the roller 96 serves as a die when the pellets are extruded through the orifices 98 formed therein.

By the provision of rotary pellet mills constructed in accordance with the teachings of my invention, it is possible to obtain a greater production of pellets without a substantial increase in the horsepower used to drive the rotary pellet mill. Moreover, undue wear in both bearings and engaging surfaces is eliminated by the symmetrical arrangement of the die members as supporting means for the roller in which they are located. Furthermore, jamming and rejection of the feed occasioned by the relatively small space at the "nip" of the roller and die in conventional constructions is eliminated because of the relatively large diameter of the roller with respect to the rotary die members incorporated therein providing a relatively large space at the "nip" of the dies with the roller into which a substantial mass of feed can be received.

I claim as my invention:

1. In a pellet mill, the combination of: a rotatable roller having a die-engaging surface formed on the interior thereof; and a plurality of rotatable dies mounted within said roller with their peripheries in supporting and driven relationship with said roller whereby said dies rotatably support said roller and said roller drives said dies, said dies having a plurality of pellet forming orifices therein for the formation of pellets thereby.

2. In a pellet mill, the combination of: a rotatable roller having a die-engaging surface formed on the interior thereof and a plurality of pellet forming orifices communicating with said surface; and a plurality of rotatable dies mounted within said roller with their peripheries in supporting and driven relationship with said roller whereby said dies rotatably support said roller and said roller drives said dies, said dies having a plurality of pellet forming orifices therein for the formation of pellets thereby.

3. In a pellet mill, the combination of: a rotatable roller having a die-engaging surface formed on the interior thereof; and a plurality of rotatable dies mounted within said roller with their peripheries in supporting and driven relationship with said roller whereby said dies rotatably support said roller and said roller drives said dies, said dies having a plurality of pellet forming orifices therein for the formation of pellets thereby and being adjustable toward said surface to maintain contact therewith despite the wearing of said surface.

*4. In a pellet mill the combination of: a ring member, a plurality of roller members disposed within said ring member in pressure engagement with the inner face of said ring member and providing the main support for said ring member causing the same to float on said roller members during relative movement between said members, one of said members having extrusion apertures therein through which material may be extruded during said relative movement, means for introducing material between such relative movable members for extrusion through said apertured member, and means for causing said relative movement.*

*5. In a pellet mill the combination of: a ring member, at least three roller members disposed within said ring member in pressure engagement with the inner face of said ring member and providing the main support for said ring member causing the same to float on said roller members during relative movement between said members, one of said members having extrusion apertures therein through which material may be extruded during said relative movement, means for introducing material between such relative movable members for extrusion through said apertured member, and means for causing said relative movement.*

References Cited in the file of this patent or the original patent

UNITED STATES PATENTS

| | | |
|---|---|---|
| 1,467,883 | Sizer | Sept. 11, 1923 |
| 2,160,302 | Billows | May 30, 1939 |
| 2,174,141 | Sizer | Sept. 26, 1939 |
| 2,241,546 | Evenstad et al. | May 13, 1941 |

FOREIGN PATENTS

| | | |
|---|---|---|
| 159,369 | Germany | Aug. 26, 1940 |